(12) United States Patent
Hessenberger

(10) Patent No.: US 11,584,105 B2
(45) Date of Patent: Feb. 21, 2023

(54) FLAME PROTECTION FABRIC FOR VEHICLE SEATS, IN PARTICULAR FOR AIRCRAFT SEATS

(71) Applicant: NEVEON Austria GmbH, Kremsmünster (AT)

(72) Inventor: Norbert Karl Hessenberger, Ohlsdorf (AT)

(73) Assignee: NEVEON Austria GmbH, Kremsmünster (AT)

( * ) Notice: Subject to any disclaimer, the term of this patent is extended or adjusted under 35 U.S.C. 154(b) by 171 days.

(21) Appl. No.: 16/494,430

(22) PCT Filed: Mar. 20, 2018

(86) PCT No.: PCT/EP2018/057005
§ 371 (c)(1),
(2) Date: Sep. 16, 2019

(87) PCT Pub. No.: WO2018/177808
PCT Pub. Date: Oct. 4, 2018

(65) Prior Publication Data
US 2021/0114332 A1 Apr. 22, 2021

(30) Foreign Application Priority Data
Mar. 29, 2017 (DE) ............ 10 2017 205 284.8

(51) Int. Cl.
| | |
|---|---|
| *B32B 5/02* | (2006.01) |
| *B64D 11/06* | (2006.01) |
| *B32B 5/24* | (2006.01) |
| *B32B 5/26* | (2006.01) |
| *B32B 5/30* | (2006.01) |
| *B32B 7/12* | (2006.01) |

(52) U.S. Cl.
CPC ............. *B32B 5/022* (2013.01); *B32B 5/026* (2013.01); *B32B 5/245* (2013.01); *B32B 5/26* (2013.01);
(Continued)

(58) Field of Classification Search
CPC ......... B32B 5/022; B32B 5/026; B32B 5/245; B32B 5/26; B32B 5/30; B32B 7/12;
(Continued)

(56) References Cited

U.S. PATENT DOCUMENTS

| | | | |
|---|---|---|---|
| 4,750,443 A | 6/1988 | Blaustein et al. | |
| 4,865,906 A * | 9/1989 | Smith, Jr. ......... | D04H 1/43835 442/197 |

(Continued)

FOREIGN PATENT DOCUMENTS

| | | |
|---|---|---|
| CN | 104828249 A | 8/2015 |
| DE | 102010009351 A1 | 8/2011 |

(Continued)

OTHER PUBLICATIONS

Espacenet Translation of JP-2009120994-A (Year: 2021).*

*Primary Examiner* — Michael Zhang
(74) *Attorney, Agent, or Firm* — The Webb Law Firm

(57) ABSTRACT

Disclosed is a flame protection fabric provided for vehicle cushions, in particular for aircraft cushions, the flame protection fabric including the following layers: at least one first abrasion-resistant layer as an abrasion layer including at least one textile material with high abrasion resistance of at least one fiber type, and at least one second layer as a barrier layer including at least one fibrous fleece of at least one flame-proof fiber type. The at least one abrasion layer is provided as a first layer on at least one side of the at least one barrier layer as a second layer.

15 Claims, 1 Drawing Sheet

(52) U.S. Cl.
CPC ............... B32B 5/30 (2013.01); B32B 7/12 (2013.01); B64D 11/0647 (2014.12); *B32B 2262/0246* (2013.01); *B32B 2262/0269* (2013.01); *B32B 2262/14* (2013.01); *B32B 2264/108* (2013.01); *B32B 2266/06* (2013.01); *B32B 2307/3065* (2013.01); *B32B 2307/554* (2013.01); *B32B 2307/718* (2013.01); *B32B 2601/00* (2013.01); *B32B 2605/18* (2013.01)

(58) Field of Classification Search
CPC .... B32B 2262/0246; B32B 2262/0269; B32B 2262/14; B32B 2264/108; B32B 2266/06; B32B 2307/3065; B32B 2307/554; B32B 2307/718; B32B 2601/00; B32B 2605/18; B64D 11/0647
See application file for complete search history.

(56) References Cited

U.S. PATENT DOCUMENTS

| | | | |
|---|---|---|---|
| 5,669,799 A | 9/1997 | Moseneder et al. | |
| 6,790,795 B2 * | 9/2004 | Erb, Jr. | B32B 5/26 442/35 |
| 2002/0098753 A1 | 7/2002 | Latham et al. | |
| 2002/0182967 A1 | 12/2002 | Erb, Jr. et al. | |
| 2006/0264136 A1 | 11/2006 | Chiantese | |
| 2007/0094804 A1 | 5/2007 | Knoff | |
| 2009/0258180 A1 | 10/2009 | Goulet | |
| 2010/0330275 A1 * | 12/2010 | Panse | D06M 11/74 427/230 |
| 2011/0104466 A1 * | 5/2011 | Atkinson | D04H 1/70 428/219 |
| 2011/0165397 A1 | 7/2011 | Roe et al. | |
| 2011/0207379 A1 * | 8/2011 | Henkes | B60N 2/58 442/36 |

FOREIGN PATENT DOCUMENTS

| | | | |
|---|---|---|---|
| EP | 0609715 B1 | | 12/1996 |
| GB | 2191792 A | | 12/1987 |
| JP | 2009120994 A | * | 6/2009 |
| JP | 2009120994 A | | 6/2009 |
| WO | 2004076730 A2 | | 9/2004 |

* cited by examiner

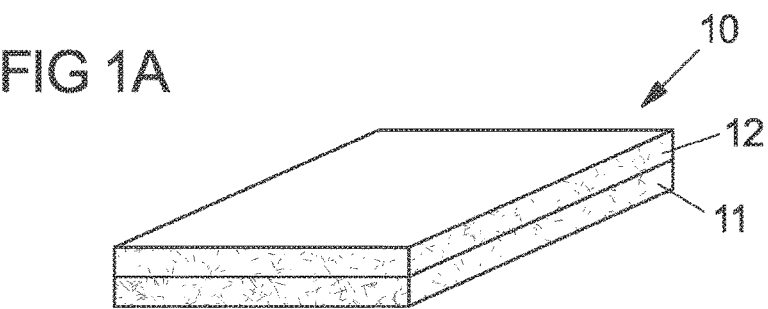
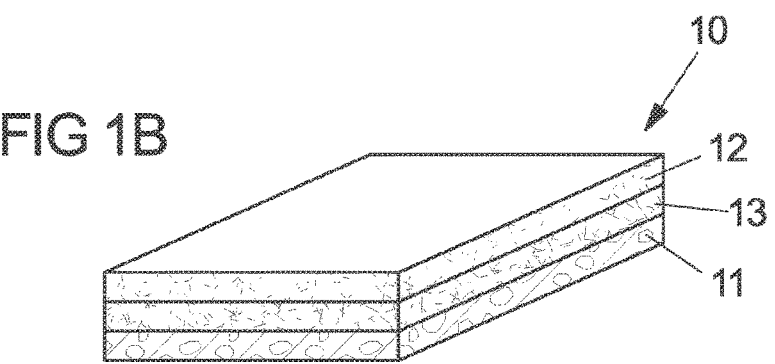
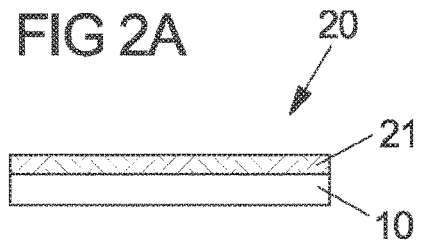
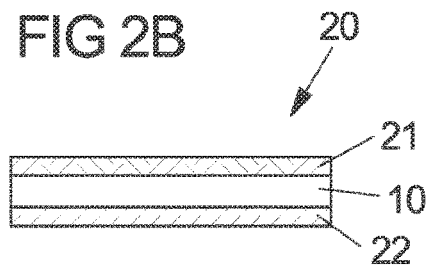
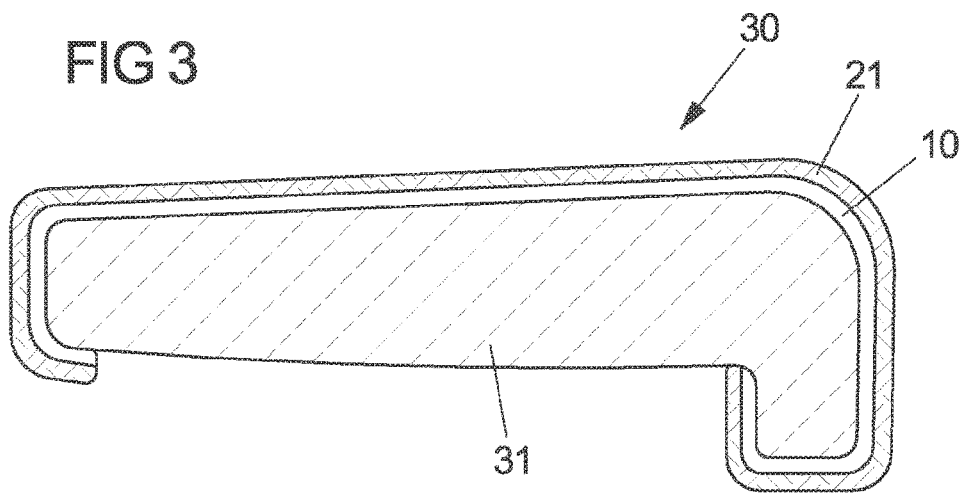

FLAME PROTECTION FABRIC FOR VEHICLE SEATS, IN PARTICULAR FOR AIRCRAFT SEATS

CROSS-REFERENCE TO RELATED APPLICATIONS

This application is the United States national phase of International Application No. PCT/EP2018/057005 filed Mar. 20, 2018, and claims priority to German Patent Application No. 10 2017 205 284.8 filed Mar. 29, 2017, the disclosures of which are hereby incorporated by reference in their entirety.

BACKGROUND OF THE INVENTION

Field of the Invention

The disclosure concerns a flame protection fabric for a vehicle cushion, a process for producing such aflame protection fabric, a cover for a vehicle cushion with such aflame protection fabric and a cushion.

Description of Related Art

The disclosure refers to a fabric with flame protection properties which is suitable for use in vehicle cushions, in particular aircraft cushions, but is also suitable for use in automobiles, buses or trains.

With regard to aircraft applications, standard flame and heat resistance requirements must be met by such a flame protection fabric. Protection by a flame protection fabric, which must be provided, depends both on the type of cushion covered by the flame protection fabric and on an outer cover or face material.

Various approaches to increasing the flame resistance of cushions that can be used for aircraft structures such as aircraft seats are known.

For example, U.S. Pat. No. 6,790,795 B2 describes a flame protection fabric consisting of a non-woven fabric of para-aramid and pre-oxidised polyacrylonitrile (pre-ox PAN) fibers with a basis weight of between 100-475 g/m². The nonwoven fabric is supported by a mesh of meta-aramid fibers, such as Nomex fibers. Fabric fleece and fabric mesh together form the flame protection fabric, which is attached to a seat cushion together with a suitable cover.

Although this flame protection fabric provides increased flame protection, it has a relatively low abrasion resistance, so that frequent replacement of the cover containing such a flame protection fabric must take place. This causes long aircraft downtimes and associated high costs.

SUMMARY OF THE INVENTION

The object underlying the propsed solution is now to provide a flame protection fabric for cushions for vehicle structures, such as aircraft structures, which have a high flame resistance combined with high abrasion resistance and low weight and can also be easily attached to cushions of an aircraft structure, such as seat cushions, backrest cushions, pillows, armrest cushions or leg support cushions.

This object is solved with a flame protection fabric (or fire blocker) with features as described herein.

Correspondingly, a flame protection fabric is provided for vehicle cushions, in particular for aircraft cushions, wherein the flame protection fabric comprises the following layers:

at least one first abrasion-resistant layer as an abrasion layer comprising at least one textile material with high abrasion resistance of at least one type of fiber, and at least one second layer as barrier layer comprising at least one fibrous fleece of at least one flame-proof fiber type, wherein said at least one abrasion layer is provided as a first layer on at least one side of said at least one barrier layer as a second layer.

A flame protection fabric is thus produced from at least two layers or two layers of different materials, the first layer having high abrasion resistance and the second layer having high flame resistance. Both layers preferably contain different proportions of flame-proof fibers, which have a low weight per unit area or dead weight as well as a high flame and heat resistance and meet the regulatory requirements and test standards. At the same time, the flame protection fabric has a high abrasion resistance. Thus, the flame protection fabric, in accordance with the proposed solution, combines high abrasion resistance with constant or improved fire stability compared to known fabrics.

For example, the at least one abrasion layer in the flame protection fabric has an abrasion resistance of at least 30,000 cycles, preferably of at least 45,000 cycles, in particular of at least 55,000 cycles, particularly preferably of at least 150,000 cycles. Abrasion resistance is determined according to Martinedale DIN ISO 12947 1; BS 5960; 1988. In the Martindale test procedure, cotton is used as the standard material. The required level of abrasion resistance of the flame protection fabric is influenced by the intended use. Thus, the abrasion resistance depends on the aircraft structure, e.g. seat bottom shell or fabric (slide frame) or backrest structure, in or on which the flame protection fabric is used. The aim is to provide a flame protection fabric that can be used for all aircraft structures.

In a further approach to determining the abrasion resistance of the flame protection fabric, a polyamide hook band (Velcro) was used as the internal standard, which better reflects the real conditions of use in an aircraft seat. Here, the fabric at hand achieved abrasion values of at least 4000 cycles, whereas the abrasion values of conventional fabrics such as 7725R from Tex Tech Industries are 500-600 cycles.

The high abrasion resistance of the textile material used for the abrasion layer is due in particular to a high degree of closeness and small fiber spacing of the fibers used in the textile material. Accordingly, the tensile strength of the textile used for the abrasion layer is in a range between 700 and 1200 N/25 mm, preferably between 800 and 1100 N/25 mm, preferably between 850 and 1000 N/25 mm in the longitudinal direction and in a range between 400 and 800 N/25 mm, preferably between 500 and 700 N/25 mm, preferably between 500 and 600 N/25 mm in the transverse direction. The tensile strength is determined according to DIN 53357-A with a 25 mm wide strip.

The textile material used as the abrasion layer can be a woven fabric, a knitted fabric or a crocheted fabric. It is preferred if the textile material used has the same appearance on the front and back side.

In the present case, a woven fabric is understood to be a flat textile fabric consisting of at least two thread systems crossed at right angles or almost at right angles, the threads running in the longitudinal direction being referred to as warp threads and the threads running in the transverse direction being referred to as weft threads. The threads pass in a certain rhythm (binding) over and under the transverse threads. In the fabric used here as the abrasion layer, a fiber lies against each other in warp direction and a fiber against each other in weft direction. This results in a high degree of closeness, A knitted fabric and a crocheted fabric, on the other hand, are mesh materials and are produced from thread systems by mesh formation, in which a thread loop is looped into another thread loop. In the case of a crocheted fabric, one stitch is made next to the other, i.e. the thread runs horizontally; while in the case of a knitted fabric, the thread forms superimposed stitches, i.e. the thread runs vertically. Here, too, a high degree of closeness is achieved by a small fiber spacing.

In one embodiment, the type of fiber used in the abrasion layer may be synthetic or natural fibers.

Polymer fibers selected from the group of polyacrylonitrile fibres (PAN fibres), preoxidised PAN fibres, polyaramide fibres such as para-aramid fibres (Kevlar) or meta-aramid fibres (Nomex), kynol novoloid or carbon fibers can be used as synthetic fibers. Flame protection fibers can also be used. Preferred fibers are para-aramid fibers (or alternatively meta-aramid fibers) and polyacrylonitrile fibers (PAN fibers).

Flame protection seed fibers such as cotton fibers or flame protection blast fibers such as hemp fibers can be used as natural fibers.

In another embodiment of the flame protection fabric, the abrasion layer can also consist of more than one type of fiber. Two, three or four different fiber types are preferred, whereby fiber type and fiber content can be combined and varied at will. Only two fiber types are used in a preferred embodiment, whereby polyaramid fibers and polyacrylonitrile fibers (PAN fibers) are preferred.

In the case of the use of two fiber types in the abrasion layer, the quantitative proportions can vary arbitrarily in a range between 5 and 95 wt %, preferably between 10 and 90 wt %, particularly preferably between 20 and 80 wt %.

In one variant, the abrasion layer can comprise
  50 to 90% by weight, preferably 60 to 80% by weight, in particular 70% by weight, of a first type of fiber, and
  10 to 50% by weight, preferably 20 to 40% by weight, in particular 30% by weight of a second fiber type.

In a particularly preferred embodiment of the flame-protection fabric at hand, the at least one abrasion layer consists of
  50 to 90 wt %, preferably 60 to 80 wt %, in particular 70 wt % polyacrylonitrile (PAN) fibers, and
  10 to 50% by weight, preferably 20 to 40% by weight, in particular 30% by weight para-aramid fibers.

In another preferred embodiment of this flame protection fabric, the at least one abrasion layer has a weight per unit area of between 100 and 180 g/m$^2$, preferably between 110 and 150 g/m$^2$, in particular preferably between 130 and 140 g/m$^2$.

In general, it is conceivable and possible to use more than one textile layer as an abrasion layer, e.g. two, three or four.

The thickness of the abrasion layer is in a range between 0.2 and 1 mm, preferably 0.4 to 0.8 mm, especially 0.5 mm.

As mentioned above, the abrasion layer may comprise or consist of a fiber mixture of fibers based, for example, on polyaramides (especially para-aramide) and polyacrylonitrile.

Polyaramides (aromatic polyamides) are polyamides in which the amide groups are bound to aromatic groups. Aramides belong to the group of liquid crystal polymers (FKP). The main types are poly(p-phenylene terephthalamide) (PPTA, trade names: Kevlar, Twaron) and poly(m-phenylene isophthalamide) (PMPI, trade names: Nomex, Teijinconex).

Polyacrylonitrile fibers (PAN fibers) typically consist of 100% polyacrylonitrile. PAN fibers are hard, stiff, and resistant to chemicals and solvents and have a melting point above the decomposition temperature. Copolymer fibers consisting of polyacrylonitrile (content >85%) and polymethyl methacrylate can also be used.

The at least one abrasion layer is preferably applied over the entire surface of the at least one barrier layer and is therefore preferably not in the form of a grid or grid fabric.

As stated above, the at least one barrier layer consists of at least one fibrous fleece of at least one flame-proof fiber type.

Fibrous fleeces (or nonwovens) are structures of limited length fibers, continuous filaments or cut yarns of any kind and origin, which have been assembled in any way to form a fleece (a fibrous layer, a fibrous pile) and have been joined together in any way, with the exception of interlacing of yarns as occurs in weaving, knitting, knitting (see above). Fibrous fleeces are mostly flexible textile fabrics, i.e. they are easy to bend, their main structural elements are textile fibers and they are comparatively thin compared to their length and width.

In the present case, the fibers of the fibrous fleece used as the barrier layer are needled and then smoothed or calendered (or pressed or ironed between two rolls).

In one embodiment, the type of fiber used in the barrier layer may include synthetic or natural fibers. Preferably, the barrier layer comprises synthetic fibers in the form of polymer fibers selected from the group of polyacrylonitrile fibers (PAN fibers), preoxidized PAN fibers, acrylonitrile fibers (e.g. PYROTEX), polyaramide fibers, kynol novoloid, para-aramide (Kevlar), meta-aramide (Nomex), basalt fiber, polysilicic acid (SIALOXOL compounds), carbon fiber.

In another embodiment of the flame protection fabric, the barrier layer can also consist of more than one type of fiber. Two, three or four different fiber types are preferred, whereby fiber type and fiber content can be combined and varied at will.

In the case of the use of two fiber types in the barrier layer, the quantitative proportions can vary in any range between 5 and 95% by weight, preferably between 10 and 90% by weight, particularly preferably between 20 and 80% by weight.

In the case of the use of three fiber types, the quantitative proportions may look as follows:
  50 to 90% by weight, preferably 60 to 80% by weight, in particular 70% by weight, of a first type of fibre,
  5 to 30% by weight, preferably 10 to 20% by weight, in particular 15% by weight, of a second type of fibre, and
  5 to 30% by weight, preferably 10 to 20% by weight, in particular 15% by weight, of a third type of fibre.

In a particularly preferred embodiment of the flame protection fabric at hand, there is at least one barrier layer
  50 to 90 wt %, preferably 60 to 80 wt %, in particular 70 wt % acrylonitrile fibers (such as PYROTEX fibers),
  5 to 30% by weight, preferably 10 to 20% by weight, in particular 15% by weight para-amid fibers, and
  5 to 30 wt %, preferably 10 to 20 wt %, in particular 15 wt % pre-oxidized polyacrylonitrile (preox PAN) fibers.

In another preferred embodiment of this flame protection fabric, at least one barrier layer has a basis weight of between 50 and 150 g/m$^2$, preferably between 60 and 120 g/m$^2$, in particular preferably between 70 and 100 g/m$^2$.

The thickness of the barrier layer is between 0.7 and 1.3 mm, preferably between 0.9 and 1.2 mm, preferably between 1.0 and 1.2 mm.

Even in the case of barrier layers, it is generally conceivable and possible to use more than one nonwoven layer as the barrier layer, e.g. two, three or four.

As mentioned above, the barrier layer may consist of a fiber mixture of fibers based on acrylonitrile fibers (such as PYROTEX), pre-oxidised polyacrylonitrile fibres and para-aramid fibers.

PYROTEX fibers are flame-proof fibers based on acrylonitrile. PYROTEX fibers are characterized by high acid/base resistance; UV resistance, resistance to solvents, hydrolysis and oxidation and permanent temperature resistance up to max. 250° C.

Pre-oxidized polyacrylonitrile fibers (preox PAN fiber) are oxidized PAN fibers with a very high flame resistance.

This flame protection fabric is free of fillers, such as inorganic fillers, or other additives. In addition, it does not have a silicone coating or similar, as often used in the past.

In another preferred embodiment, the flame protection fabric at hand comprises at least one intumescent layer. In the context of this proposed solution, the term intumescence refers to an expansion or swelling, i.e. an increase in the volume of a solid body or material. Intumescent materials increase in volume under the influence of heat and decrease in density accordingly.

In the case of the flame protection fabric at hand, at least one intumescent layer shall consist of expanded graphite, carbon or suitable flame protection fibers.

The use of expanded graphite as an intumescent layer is particularly preferred. Expanded graphite, also known as expandable graphite, is produced from the naturally occurring mineral graphite. A graphite flake consists of layers of honeycomb carbon atoms. Within the layers the atoms are very firmly connected by covalent bonds. Only weak bonding forces prevail between the layers, so that molecules can be intercalated between the graphite layers. By embedding acids, usually sulphuric acid, graphite is converted into expanded graphite. When expanded graphite is heated, the graphite flakes expand, depending on the quality, from a temperature of approx. 140° C., present at approx. 180° C. to a multiple of the original volume. The graphite layers are driven apart like an accordion by the evaporation of the embedded compounds. The expanded flakes have a "worm-like" appearance and are usually several millimeters long. One of the main applications of expanded graphite is flame protection. When exposed to heat, the expanded graphite expands and forms an intumescent layer on the surface of the material. This slows down the spread of the fire and counteracts the most dangerous consequences of the fire for humans, namely the formation of toxic gases and smoke.

The at least one intumescent layer is preferably provided as an intermediate layer between the abrasion layer and the barrier layer.

If expandable graphite is used as intumescent layer, the expandable graphite is first introduced into a suitable binder. The abrasive layer is then coated with this solution or suspension.

The at least one expanded graphite layer has a basis weight between 30 and 110 $g/m^2$, preferably between 40 and 100 $g/m^2$, preferably between 50 and 80 $g/m^2$.

The thickness of the expanded graphite layer is between 0.1 and 0.3 mm, preferably between 0.1 and 0.2 mm.

In a particularly preferred embodiment, the flame protection fabric consists of at least one abrasion layer in the form of a knitted or woven fabric with more than 30,000 cycles of abrasion resistance, at least one intumescent layer in the form of expanded graphite, carbon or various flame protection fibers, and at least one barrier layer in the form of a needle fleece of flame-proof materials.

The layer structure of the flame-protection fabric is in a preferred variant (seen from top to bottom): abrasion layer-intumescent layer-barrier layer.

The total thickness of the flame-protection fabric is between 1.5 and 2.5 mm, preferably between 1.8 and 2.0 mm, with a total weight of between 200 and 300 g, preferably between 220 and 280 g, and in particular between 250 and 270 g.

This flame protection fabric is manufactured in a process with the following steps:
  providing at least one fibrous fleece of at least one flame-proof fiber type as a barrier layer, and
  applying at least one textile material with high abrasion resistance of at least one type of fiber to at least one side of the at least one fibrous fleece acting as a barrier layer.

In an embodiment of the present process, the fibrous fleece used as barrier layer comprises 50 to 90% by weight, preferably 60 to 80% by weight, in particular preferably 70% by weight, of a first fiber type, 5 to 30% by weight, preferably 10 to 20% by weight, in particular preferably 15% by weight, of a second fiber type, and 5 to 30% by weight, preferably 10 to 20% by weight, in particular preferably 15% by weight, of a third fiber type.

Particularly preferably, the fibrous fleece used as a barrier layer comprises 50 to 90% by weight, preferably 60 to 80% by weight, especially preferably 70% by weight, of acrylonitrile fibers (such as PYROTEX fiber), 5 to 30% by weight, preferably 10 to 20% by weight, especially preferably 15% by weight, of para-amide fibers, and 5 to 30% by weight, preferably 10 to 20% by weight, especially preferably 15% by weight, of pre-oxidized polyacrylonitrile (preox PAN) fibers.

In another embodiment, the at least one abrasion layer comprises
  50 to 90% by weight, preferably 60 to 80% by weight, in particular 70% by weight, of a first type of fiber, and
  10 to 50 wt %, preferably 20 to 40 wt %, in particular preferably 30 wt % of a second fiber type.

In a particularly preferred embodiment of the present process, the fabric acting as an abrasion layer consists of 50 to 90 wt %, preferably 60 to 80 wt %, in particular 70 wt % polyacrylonitrile (PAN) fibers and 10 to 50 wt %, preferably 20 to 40 wt %, in particular 30 wt % para-aramide fibers.

In one variant of the present process it is intended that at least one textile material as an abrasion layer is coated with at least one intumescent layer.

In a further embodiment of the present process it is provided that the layered structure of abrasion layer, optionally intumescent layer and barrier layer is laminated, coated, glued or needled.

As indicated above, this flame protection fabric is used for cushions in a vehicle, especially in an aircraft.

In one variant, the flame protection fabric present is used in a cover for a cushion (preferably made of foam) of a vehicle structure, in particular an aircraft structure, such as an aircraft seat cushion, whereby at least one coating is provided on the top side of the flame protection fabric. This coating can be made of leather, artificial leather or a (haptically pleasant) decorative fabric.

It is desirable if at least one flame protection fabric is laminated, coated, glued or sewn to the inside (i.e. the side not visible to the user) of at least one coating. This variant thus has a one-piece cover made of flame protection fabric and coating.

This cover of flame protection fabric and coating can in turn be applied to a foam part (as a pad) to provide a cushion for a vehicle structure, in particular an aircraft structure such as an aircraft seat cushion, backrest, headrest, armrest or legrest. For this purpose, the at least one coating is attached to the at least one foam part by means of suitable fasteners.

In another variant, the at least one flame protection fabric is glued to at least one part of the foam and the at least one coating is attached to the flame protection fabric with adhesive or fleece tapes.

The cover is preferably adapted to the shape of the foam part. This allows the cover to extend over the front of the seat cushion and cover the hollow of the knee.

The cushion consists of a cold molded foam, in particular an elastic, open-cell plastic foam, which can be mixed with powdery or liquid flame protections such as melamine resin, various additives or aluminum hydroxide.

BRIEF DESCRIPTION OF THE DRAWINGS

The solution is explained in more detail below with reference to the figures in the drawings.

FIG. 1A shows a schematic view of a flame protection fabric according to a first embodiment, FIG. 1B shows a schematic view of a flame protection fabric according to a second embodiment, FIG. 2A shows a schematic view of a first embodiment of a cover for a seat cushion with a flame protection fabric as shown in FIG. 1B;

FIG. 2B shows a schematic view of a second embodiment of a cover for a seat cushion with a flame protection fabric as shown in FIG. 1B; and FIG. 3 shows a schematic view of a seat cushion for an aircraft seat with a cover as shown in FIG. 2.

DESCRIPTION OF THE INVENTION

FIG. 1A shows a first embodiment of the flame protection fabric 10 consisting of a barrier layer 11 and an abrasion layer 12. The abrasion layer 12 is provided on one side (here on the upper side) of the barrier layer 11.

The barrier layer 11 consists of a fibrous fleece of 70% PYROTEX (bi-grade) fibers (acrylonitrile fibers), 15% para-aramid fibers (regenerated) and 15% preox PAN (polyacrylonitrile) fibers. In this case, the weight per unit area of the barrier layer 11 is 70 g/m².

The abrasion layer 12 consists of a fabric of 70% PAN (polyacrylonitrile) fibers and 30% para-aramid fibers. The weight per unit area of the abrasion layer is 130 g/m².

FIG. 1B shows a second embodiment of the flame protection fabric 10, in which a third intumescent layer 13 of expanded graphite is provided in addition to barrier layer 11 and abrasive layer 12. The expanded graphite begins to expand at 180° C. The intumescent layer 13 is made of expanded graphite.

The expanded graphite layer 13 is intended as an intermediate layer between the abrasion layer 12 and the barrier layer 11. The expanded graphite layer is applied with a weight per unit area of 50 g/m² to the abrasion layer 12.

The fabric used as abrasion layer 12 is first coated on one side with the expanded graphite and then the needled fibrous fleece used as barrier layer 11 is laminated or coated onto the coated side of the abrasion layer.

In abrasion tests using adhesive tapes, the flame protection fabric made of abrasion layer fabric, expanded graphite layer and barrier layer fleece achieves values of 4000 cycles, whereas state of the art fabrics (e.g. 7725R from Tex Tech Industries) only achieve values of 500-600 cycles in comparison.

In the so-called Oil Burn Test when using the flame protection fabric on different foam cushions, the values are comparable to those of conventional fabrics. The values determined in this test are between 3 and 6% weight loss.

FIG. 2A shows a first embodiment of a cover 20 for a seat cushion, especially for an aircraft seat cushion. The cover 20 includes the flame protection fabric 10 and a protective cover 21 (for example a leather cover or fabric cover). Flame protection fabric 10 and protective coating 21 may be bonded or laminated together so that the cover is one piece.

FIG. 2B shows a second embodiment of a cover 20 for a seat cushion, in particular for an aircraft seat cushion. Here the flame protection fabric 10 and a foam part 22 made of various foams can be glued or laminated together. A protective coating 21 is attached to the structure of flame protection fabric 10 and foam part 22 by means of adhesive or fleece tapes.

FIG. 3 shows the general structure of a seat cushion 30 for an aircraft seat. A cushion 31 completely surrounded by the flame protection fabric 10. The protective cover 21 is attached with pad 31 incl. flame protection fabric 10 by means of adhesive or fleece tapes.

The cover 20 made of the flame protection fabric 10 and a protective cover 21 covers the cushion 31. The cover 20 is fastened to the underside of the cushion 31 by means of suitable fasteners such as hooks or eyelets, buttons, adhesive or fleece tapes. The cover 20 extends over the entire upper side of cushion 31 including the hollow of the knee area.

The invention claimed is:

1. A flame protection fabric for vehicle cushions wherein the flame protection fabric comprises the following layers:
   at least one first abrasion-resistant layer as an abrasion layer comprising at least one textile material with abrasion resistance, and
   at least one second layer as a barrier layer comprising at least one fibrous fleece of at least one flame-proof fiber type,
   wherein said at least one abrasion layer is provided as a first layer on at least one side of said at least one barrier layer as a second layer,
   wherein the at least one abrasion resistant layer consists of a fibrous fleece of 50 to 90% by weight of polyacrylonitrile (PAN) fibers and 10 to 50% by weight of para-aramide fibres applied over the entire surface of the at least one barrier layer and is not in the form of a grid or grid fabric, and
   wherein the at least one barrier layer consists of at least one fibrous fleece of 50 to 90% by weight of acrylonitrile fibres, 5 to 30% by weight of para-amide fibres, and 5 to 30% by weight of pre-oxidized polyacrylonitrile (preox PAN) fibres.

2. The flame protection fabric of claim 1, wherein at least one expanded graphite layer with a weight per unit area of between 30 and 110 g/m² is provided as an intermediate layer between the at least one abrasion layer and the at least one barrier layer.

3. The flame protection fabric according to claim 1, wherein the at least one abrasion layer has a weight per unit area of between 100 and 180 g/m².

4. The flame protection fabric according to claim 1, wherein the at least one abrasion layer has an abrasion resistance of at least 30,000 cycles.

5. The flame protection fabric according to claim 1, wherein the at least one barrier layer has a weight per unit area of between 50 and 150 g/m$^2$.

6. The flame protection fabric according to claim 1, further comprising at least one intumescent layer.

7. The flame protection fabric according to claim 6, wherein at least one of the at least one intumescent layer includes expanded graphite, carbon or flame protection fibers.

8. The flame protection fabric according to claim 6, wherein the at least one intumescent layer is provided as an intermediate layer between the at least one abrasion layer and the at least one barrier layer.

9. The flame protection fabric according to claim 6, wherein the at least one intumescent layer has a weight per unit area of between 30 and 110 g/m$^2$.

10. A cushion for a vehicle seat, comprising
    at least one coating,
    at least one flame protection fabric according to claim 1,
    at least one foam part as padding.

11. The cushion according to claim 10, wherein at least one of the at least one flame protection fabric is glued to the at least one foam part, and the flame protection fabric is laminated, coated, glued or sewn to at least one cover and is attached to the foam part by means of adhesive or fleece tapes.

12. The cushion according to claim 11, wherein the at least one cover is fastened to the foam part with flame protection fabric by means of adhesive or fleece tapes.

13. A process for producing the flame protection fabric according to claim 1 comprising the steps of:
    providing the at least one fibrous fleece of at least one flame-proof fiber type as the barrier layer, and
    applying the at least one textile material with abrasion resistance as the abrasion layer of at least one fiber type to at least one side of the at least one fibrous fleece.

14. The process according to claim 13, wherein the at least one textile material as the abrasion layer is coated with at least one intumescent layer on one side before applying to the at least one barrier layer.

15. The process according to claim 13, wherein the abrasion layer, optionally intumescent layer and barrier layer are laminated, coated, glued or needled together.

\* \* \* \* \*